United States Patent [19]
Wilson et al.

[11] Patent Number: 5,193,832
[45] Date of Patent: Mar. 16, 1993

[54] SUSPENSION FOR BICYLES

[76] Inventors: Stephen R. Wilson, 2092-8th Ave.; Douglas J. Halpin, 5070 Linn La., both of, West Linn, Oreg. 97068

[21] Appl. No.: 762,576

[22] Filed: Sep. 19, 1991

[51] Int. Cl.⁵ .............................................. B62K 25/08
[52] U.S. Cl. ...................................... 280/276; 280/277
[58] Field of Search ............... 280/276, 283, 286, 284, 280/275, 277

[56] References Cited

U.S. PATENT DOCUMENTS

| | | | |
|---|---|---|---|
| 2,708,112 | 5/1955 | Seddon et al. | 280/276 X |
| 4,153,266 | 5/1979 | Uhls | 280/276 |
| 4,421,337 | 12/1983 | Pratt | 280/277 |
| 4,971,344 | 11/1990 | Turner | 280/276 |

Primary Examiner—Johnny D. Cherry
Assistant Examiner—Joseph D. Pape
Attorney, Agent, or Firm—Robert L. Harrington

[57] ABSTRACT

A front wheel shock absorbing system for a bicycle wherein the legs of the front wheel fork includes struts slidable in tubes. The struts are attached at one end to the wheel axle. The tubes slide over the struts and are fixedly secured to the forks steering tube through a triple clamp. A rim type braking mechanism is secured to the struts by a bypass attachment mechanism, preferably by the provision of a slot through the tube to permit a fastener to extend through the tube and onto the strut. The slot permits reciprocation of the strut relative to the tube. Compressible bumpers in the tube are compressed by the strut and tube interacting to provide the shock absorbing effect.

10 Claims, 4 Drawing Sheets

FIG. 2
FIG. 3
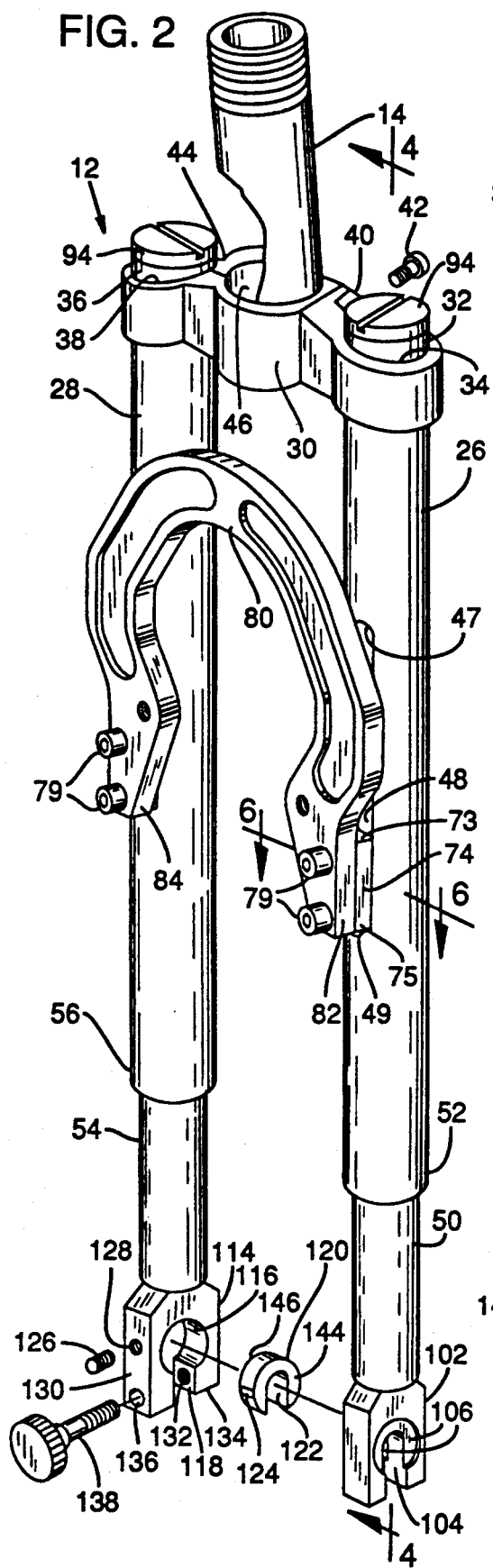
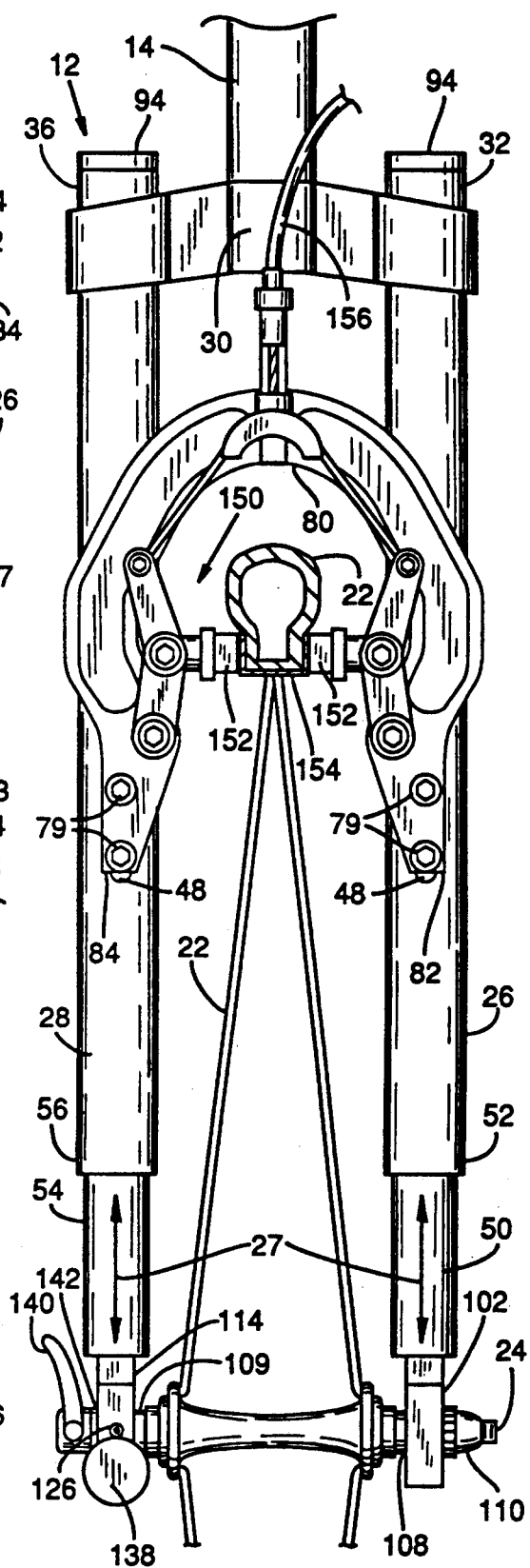

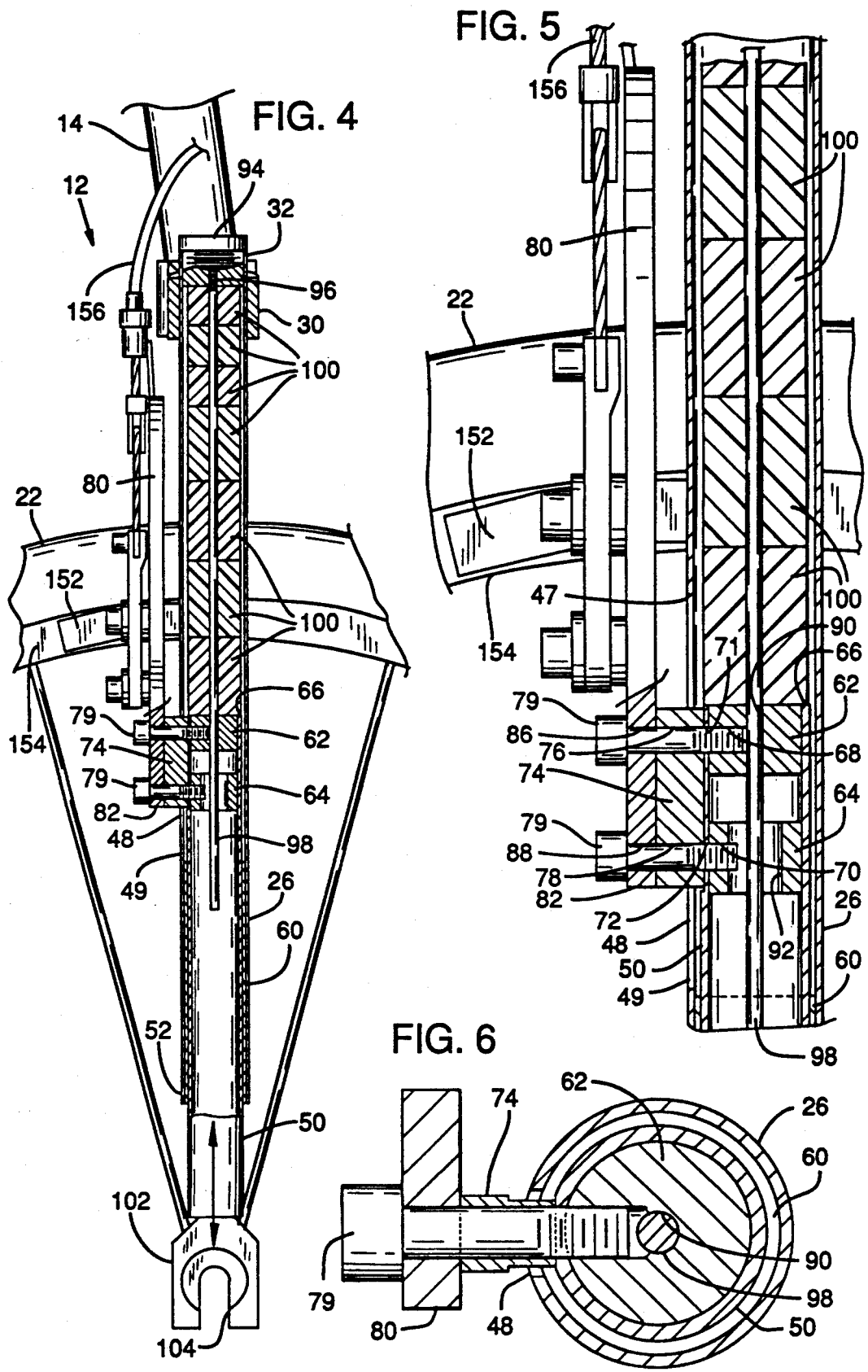

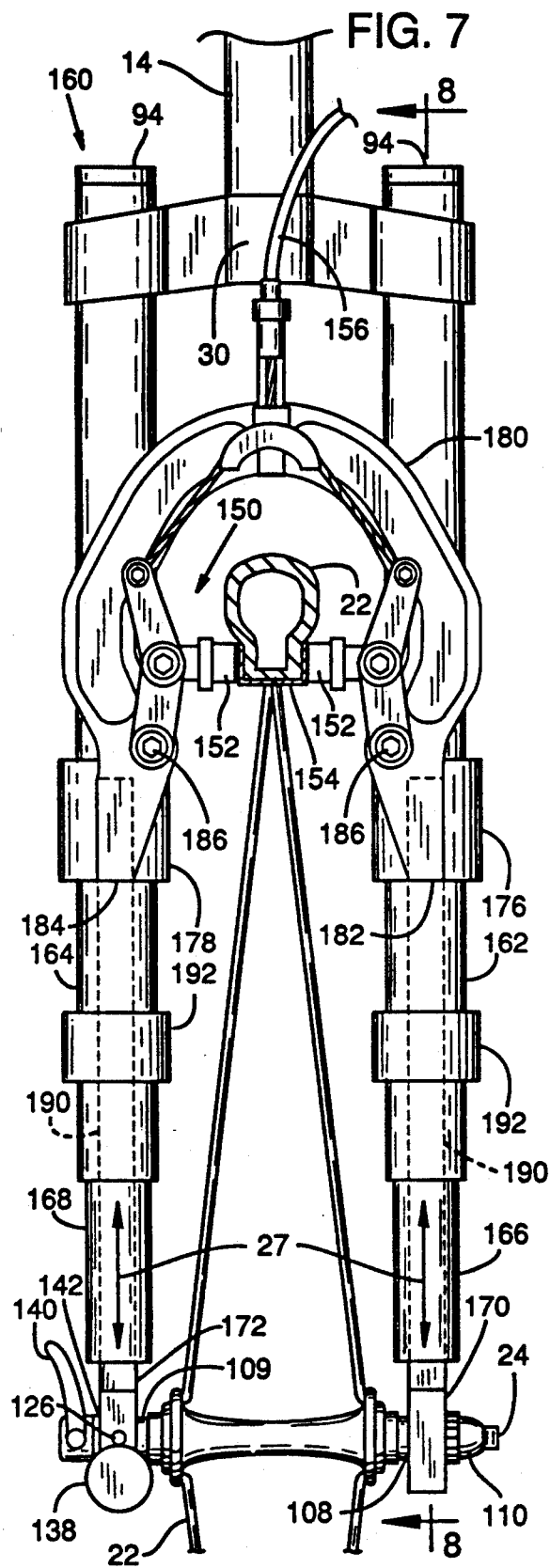
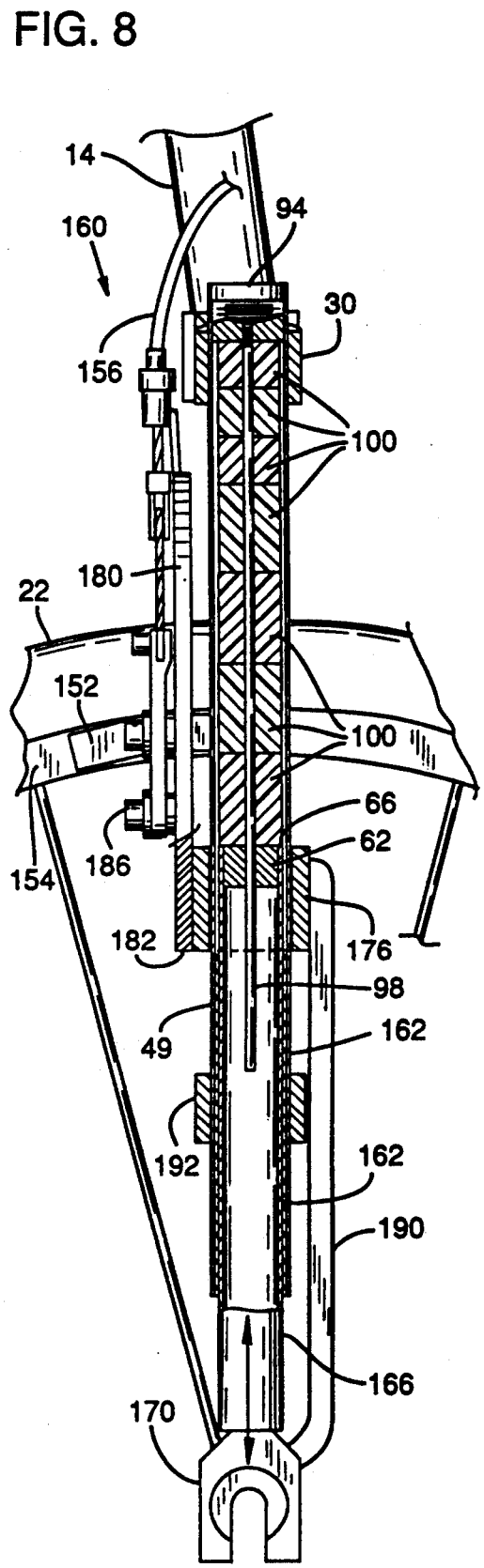

SUSPENSION FOR BICYLES

BACKGROUND INFORMATION

1. Field of the Invention

This invention relates to shock absorbing suspension systems particularly applicable to the front wheel of a bicycle.

2. Background of the Invention

This invention has particular application to bicycles that are referred to as mountain bikes or trail bikes and which are typically ridden over rough terrain. As is typical for all conventional bicycles, the front wheel of the bicycle is the steering wheel. Steering handles, i.e., handlebars, are interconnected to the wheel through a fork, the fork having parallel legs that extend upward from each side of the wheel axle and connect at the top of the wheel to a central steering tube that in turn is attached to the handlebars. The steering tube is rotatably mounted to the frame of the bicycle in a manner to support the frame on the wheel's axle while permitting rotation of the tube and thus turning of the front wheel relative to the frame.

Of concern to the off-road bicycle rider is the jolting of the front wheel as rocks and holes are encountered. This jolting is transferred to the rider through the fork, steering tube and steering handles. Besides the obvious punishment that is inflicted on the rider, there is the added concern for safety. A rider's steering handles are not so easily controlled at the instant of a severe jolt being experienced by the rider through the handles.

To accommodate this front wheel jolting, designers of trail and mountain bikes have developed front wheel, shock absorbing suspension systems.

Not previously mentioned but an important feature accommodated by the front wheel fork design is the brakes that are carried by the fork and which are applied against the front wheel rim to slow or stop the bicycle. The brake mechanism is mounted to the forks at the outer periphery of the wheel. Levers carrying a pair of brake shoes are manipulated by the rider via cables to simultaneously apply the brake shoes to both sides of the front wheel. The levers and brake shoes arrangement are designed and positioned for precise application of braking action against the wheel rim. The distance of the brake pads from the wheel axle has to be a constant distance.

Maintaining a constant distance is not a problem if the fork is a one-piece member. However, it is a problem that is encountered in designing a front wheel shock absorbing system.

Shock absorbing systems of the type contemplated herein and which have been successfully used to date have fork legs that include a rigid rod slidable in a rigid sleeve. A biasing member urges the fork's rods to an extended position relative to the fork sleeves. As bumps or holes are encountered by the front wheel, the biasing members collapse as the rods are forced into the sleeve, the biasing members largely absorbing the shock and rapid movement otherwise transferred to the steering handle.

Because the sleeves surround the rod at the wheel periphery, it has been considered necessary to attach the brake mechanism to the sleeve portions of the fork legs. Because the brake mechanism has to be a constant distance from the wheel axle, the sleeve portions are necessarily attached to the wheel axle with the rod attached to the steering tube and handle.

There are several disadvantages of this arrangement, the most notable of which is the provision of the weakest component of the system at the area encountering the most stress. The greater stress is at the top of the fork legs encountered by the rods which are less resistant to bending. Also, the heaviest portion of the fork is attached to the wheel, slowing its response to and recovery from bumps. Furthermore, whereas it is desirable to contain the biasing members inside the sleeve portions of the fork legs, the interior of the sleeve portions are inaccessible other than by dismantling the fork from the front wheel.

Examples of prior shock absorbing systems available for mountain bike front wheels are disclosed in a February 1991 article of a biking magazine titled "Mountain Bike Action". At pages 75-78 of the magazine, comparisons are made between seven bikes equipped with front wheel shock absorbers. Five of the seven are as described above. A sixth uses the steering shaft or stem to absorb the shock and is not applicable. The final version uses the fork legs as the shock absorbing members but with the rod attached to the wheel axle to obviate the concern for the weaker component absorbing the greatest stress. It is referred to as the upside down fork and overcomes the problem of the brake attachment by providing a disc brake that acts against the wheel hub rather than the rim. The disc brake is unacceptable however since it is heavier and costs more to produce. As noted in the article;

"The reason that [the manufacturer] are the only upside-down forks on the market is the fact that upside-down forks require disc brakes. ([The Manufacturer] makes its own disc)".

BRIEF SUMMARY OF THE INVENTION

The preferred embodiment of the present invention is also an upside down fork as characterized by the MBA article. Contrary to the author's statement about upside down forks requiring disc brakes, applicant's upside down fork incorporates the more acceptable rim type brakes. Whereas the outer sleeve extends past the wheel rim, so too does the rod that is attached to the wheel axle but, of course, it is sheathed inside the sleeve. Applicant provides a slot through the sleeve and fasteners extend through the slots to fasten the brake assembly directly to the rod. The slots permit the reciprocal action of the sleeve relative to the rod and the brakes are thereby fixedly positioned to the rim without interfering with the shock absorption process. Elastomer pads are provided in the top of the sleeves and are compressed by the rods during the down stroke action of the sleeves. The top of the sleeves are closed by a removable cap that provides for easy removal and replacement of the pads. Thus, different durometers of pads can be used to achieve different stiffness or softness of the shock absorption. Binding of the shock absorbers is reduced in that the rods are fixedly secured in spaced relation by the brake assembly and the axle and the sleeves are fixedly secured in spaced relation by the triple clamp. These and other advantages will become apparent to those skilled in the art with reference to the following detailed description and drawings referred to therein.

DESCRIPTION OF THE DRAWINGS

FIG. 2 is a perspective view of a preferred embodiment of a front wheel fork suspension structure as applied to the bicycle of FIG. 1.

FIG. 3 is a front view of the structure of FIG. 2 but showing a wheel and brake assembly mounted;

FIG. 4 is a view as viewed on view lines 4—4 of FIG. 2;

FIG. 5 is an enlarged partial view of FIG. 4;

FIG. 6 is an enlarged view as viewed on view lines 6—6 of FIG. 2; and

FIGS. 7 and 8 are front and side views of an alternate embodiment of the fork suspension structure.

DESCRIPTION OF THE PREFERRED EMBODIMENT

Figure 1:
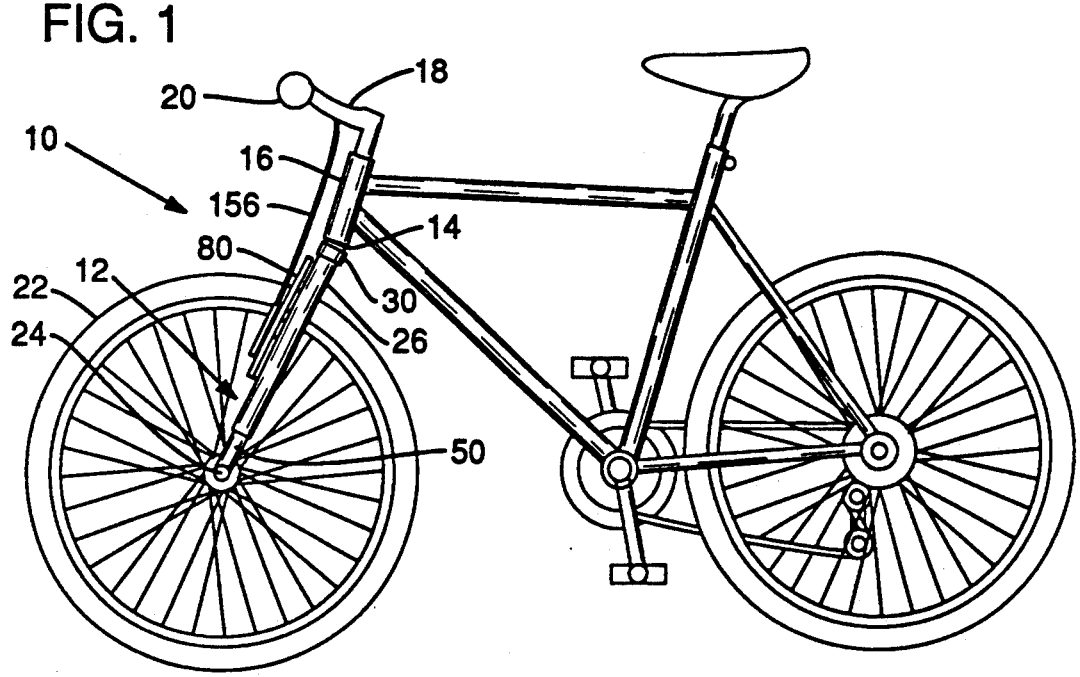
FIG. 1 illustrates a bicycle having a shock absorbing front fork suspension in accordance with the present invention.

Refer now to FIG. 1 of the drawings which illustrates a bicycle 10 suited for traversing off-the-road terrain. The bicycle 10 is typically ridden over rough terrain and obstacles and therefore utilizes a front suspension system in the fork assembly 12 to absorb the shocks. The suspension system not only absorbs shocks but improves the riders control capability when encountering typical obstacles of rough terrain such as chuck holes, rocks, steep inclines and the like. The suspension system also aids in maintaining the front wheel in contact with the ground for greater steering and braking control of the bicycle 10.

Referring also to FIG. 3 (which provides greater detail of the fork assembly 12) the fork assembly 12 is mounted to the frame of the bicycle 10 in a conventional manner with a steering tube 14 of the fork assembly 12 fitting rotatably in a steering head 16 of the frame. A stem 18 is fixedly fitted to the steering tube 14 and has handle bars 20 extending from the stem for steering the front wheel 22 of the bicycle 10. The front wheel 22 is rotatably mounted at the lower end of the fork assembly 12 on an axle 24.

The fork assembly 12 absorbs the shock of the wheel 22 impacting obstacles by movement of the lower struts 50, 54 relative to the upper tubes 26, 28 which permits the wheel 22 to move relative to the frame of the bicycle 10. The struts 50, 54 are slidably moveable in the tubes 26, 28 against a yieldable biasing member as indicated by the bi-directional arrows 27. As the wheel 22 encounters an obstacle such as a rock, the struts 50, 54 are forced upwardly into the tubes 26, 28 forcing the biasing member to yield thus absorbing the impacting shock. Once the wheel is passed the obstacle, the biasing member urges the struts 50, 54 to extend from the tubes 26, 28.

It will be appreciated that the greatest stress occurs at the juncture of the large tubes 26, 28 with the triple clamp 30. The fork assembly 12 of the present invention utilizes the largest structural members (i.e. tubes 26, 28) at the point of greatest stress. This arrangement also provides for easy and ready access to the biasing member(s) through a cap fitted to the upper ends of the tubes 26, 28. A user may change the shock absorbing characteristics of the fork assembly 12 by merely removing the caps 94 which allows removal of the biasing member without further disassembly. The biasing member then may be changed to suit the weight of the rider and/or travel conditions.

As shown in FIG. 3 and which will be described in greater detail later, the brake assembly 150 must move with the axle 24 of the wheel in order to maintain the proper attitude of the brake in reference to the rim of the wheel. The cross brace 80, which supports the brake assembly is fixedly attached to the upper ends of the struts 50, 54 and as the struts 50, 54 and thus the wheel 22 move relative to the tubes 26, 28, the brake 150 attached to the brace 80 moves with the wheel.

Refer now to FIG. 2 of the drawings which illustrates in perspective view the fork assembly 12. The fork assembly 12 has large hollow tubes 26, 28 extended from a triple clamp 30, the tubes 26, 28 being parallel to each other. An end 32 of the tube 26 fits in a bore 34 provided in the triple clamp 30. An end 36 of the tube 28 fits in a bore 38 provided in the clamp 30. A slot 40 communicating with the bore 34 is provided in the clamp 30 as shown to provide a collet type clamping of the cylinder 26 by a fastener 42 in a known conventional manner. A similar slot 41 communicating with the bore 38 is provided in the clamp 30 to provide a collet type clamping of the cylinder 28 by another fastener 42. The steering tube 14 is rigidly fastened in a center bore 46 in the clamp 30, and as shown, the bore 46 is at an angle to the bores 34, 38 which provides the offset for the fork assembly 12 when assembled to the frame of the bicycle 10. Each tube 26, 28 has a longitudinal slot 48 in their side walls.

The small hollow strut 50 is installed in the tube 26, the strut 50 being slidably moveable in the tube 26 and extending beyond the end 52 of the tube 26 as shown. The small hollow strut 54 is installed in the tube 28, the strut 54 being slidably moveable in the tube 28 and extending beyond the end 56 of the tube 28 as shown.

Refer now to FIGS. 4, 5 and 6 of the drawings. It will be appreciated that these figures show the detail of the large tube 26, the strut 50 and the biasing member comprised of an arrangement of bumpers 100. The same structure is applicable to the large tube 28, and the strut 54. As shown, the small strut 50 is received within the large tube 26 in a bearing sleeve 60 that extends from the end 52 of the tube 26 to the lower end of the slot 48 (as viewed in the Fig). The sleeve 60 is preferably of a self lubricating material and is fixedly fastened to the interior of the tube 26 as by gluing. Bushings 62 and 64 are received in the end 66 of the strut 50, the bushings 62, 64 of a dimension that requires a light press fit for installation to therefore hold them in position in reference to the strut 50 for assembly purposes. Bushing 62 is preferably installed flush with the end 66. A drilled and tapped bore 68 is provided in the side wall of bushing 62 and a drilled and tapped bore 70 is provided in the side wall of the bushing 64. The drilled and tapped bores 68, 70 are aligned with bores 71, 72 provided in the side wall of the strut 50 near end 66. The bores 71, 72 are strategically aligned with the bracket 102 on the end of the strut 50. A longitudinal flat is provided on the strut 50 as by milling, the flat extending between and beyond the bores 71, 72, for supporting the bottom surface of an extension bracket 74. The extension bracket 74 extends through the slot 48 and is seated on the longitudinal flat. The bracket 74 has bores 76, 78 alignable with the bores 71, 72 of the strut 50. An end 82 of a cross brace 80 is fitted to the bracket 74 and has bores 86, 88 alignable with the bores 76, 78 of the bracket. The cross brace 80 and the bracket 74 are fixedly secured to the strut 50 by threaded fasteners 79 extending through the bores 86, 88 of the cross brace 80, the bores 76, 78 of the bracket 74, the bores 71, 72 of the strut 50, and threadably engaging the tapped bores of the bushings 62, 64. The opposite end 84 of the cross brace 80 is fixedly secured to the strut 54 received in the large tube 28 in a like manner.

The cross brace 80, being fixedly attached to each strut 50, 54 assures that the struts 50, 54 will move in unison. Additionally the cross brace 80 maintains the struts 50, 54 in a parallel attitude. The distance of travel of the struts 50, 54 is limited by the brackets 74 engaging the upper and lower ends 47, 49 of the slots 48 in the tubes 26 and 28.

Still referring to FIGS. 4, 5, and 6, bushing 62 has a longitudinal center through bore 90 and bushing 64 has a longitudinal center through bore 92. The end 32 of the tube 26 is threaded internally for receiving a threaded cap 94. The cap 94 has a center threaded bore 96 for receiving a threaded end of rod 98. The rod 98 is of sufficient length to extend through the center bore 90 of the bushing 62 throughout the stroke length of the strut 50 when the cap 94 is installed in the end 32 of the tube 26. The bore 90 is larger than the rod 98 so the rod 98 will fit loosely within the bore 90. Multiple cylindrical elastopolymer bumpers 100 having center through bores sufficiently large to fit loosely on the rod 98 are installed on the rod 98. As shown, the bumpers 100 are captive between the cap 94 and the end 66 of the strut 50. The bumpers 100 are smaller in diameter than the internal diameter of the tube 26 which permits the bumpers 100 to expand or deform laterally within the tube 26 as is later explained. The rod 98 having one end attached to the cap 94 and the opposite end received in the bore 90 maintain the bumpers 100 centrally aligned within the tube 26.

The end 36 of tube 28 is also internally threaded for receiving another cap 94 having a rod 98 attached which extends through the bore 90 provided in the bushing 62 fitted to the strut 54. Of note, the bores 92 provided in bushings 64 fitted in the struts 50 and 54 are larger than the bores 90 in the bushings 62 and therefore will not interfere with the rod 98 extending through the bushings 62. The larger bore 92 also reduces the weight of the assembly.

The cylindrical bumpers 100 are stacked in an end to end arrangement to extend from the underside of the cap 94 to the end 66 of the small strut 50 when the strut 50 is fully extended out of the tube 26 to its travel limit. The strut 50 is of course limited in its outward travel by the end 75 of the bracket 74 abutting the end 49 of the slot 48.

The bumpers 100 positioned in the tubes 26, 28 between the caps 94 and the upper ends of the struts 50, 54 provide the yieldable biasing member to absorb the shocks of impacts. As the struts 50, 54 are forcibly forced into the tubes 26, 28 as a result of the wheel 22 impacting an obstacle for example, the biasing member (i.e., the stacked bumpers) will be subjected to a compressive force. The compressive force will cause the bumpers to yield, mainly by deformation, to permit the struts 50, 54 to enter the tubes 26, 28 without imparting motion to the tubes 26, 28. Recall that the bumpers 100 are smaller in diameter than the internal diameter of the tubes 26, 28 and therefore may be deformed transverse to their longitudinal axis. The bumpers, being resilient will urge the struts 50, 54 to move outwardly when the wheel has traversed the obstacle and the compressive force of impact has been relieved.

It will be appreciated that various combinations of bumpers 100 may be utilized to provide a variance in the shock absorbing characteristics of the fork assembly 12. The user will use bumpers 100 of different durometers, of different resilience characteristics and lengths to provide the shock absorbing characteristics suited to the weight of the rider and the conditions under which the bicycle is to be ridden. As previously stated, the bumpers 100 may be changed to suit by merely removing the cap 94 to gain access to the bumpers for removal and replacement.

Refer once again to FIG. 2 of the drawings. The lower ends 102, 114 of the struts 50, 54 in combination provide an adjustable drop out for the mounting of a wheel axle 24 of the wheel 22. End 102 of strut 50 is a shaped bracket fixedly attached to the strut 50 as by welding or gluing and has an open ended slot 104. The slot 104 terminates in a semi-circle closely corresponding to the diameter of the axle 24. A circular recess 106 is provided on each side of the bracket 102 concentric to the semi-circular end of the slot 104 for receiving the lock nut 108 and end nut 110 of the axle 24 (see FIG. 3). The recess 106 for receiving the locknut 108 is preferably extended to the end of the bracket 102 at a width corresponding to the diameter of the circular portion of the recess 106. End 114 of the strut 54 is a shaped bracket fixedly attached to the strut 54 as by welding or gluing. The bracket 114 has a circular through bore 116. An open ended slot 118 is provided in the bracket 114 and intersects the bore 116. A shoe 120 having an external diameter closely corresponding to the bore 116 is movably installed in the bore 116 (the shoe 120 is shown removed from the bore in order to provided a clearer depiction of the structure). The shoe 120 has an open ended slot 122 that terminates in a semicircle closely corresponding to the diameter of the axle 24 and the slot 122 is aligned with the slot 118 upon installation. An elongate longitudinal groove 124 is provided in the side wall of the shoe 120. The shoe 120 is prevented from rotating in the bore 116 by a set screw 126 (preferably of the dog point type having self locking threads) threadably inserted in a threaded through bore 128 in the leg 130 of the bracket 114. The end (point) of the set screw 126 enters the groove 124 of the shoe 120 (but is not forcibly applied to the shoe 120) to prevent rotation of the shoe 120 relative to the bore 116 and thus maintains the alignment of the slots 118 and 122. The elongation of the groove 124 does, however, permit the shoe 120 to move axially in the bore 116, the axial movement being limited by the point of the screw engaging the ends of the groove 124. A threaded bore 132 is provided in leg 134 of the bracket 114 which is aligned with a through bore 136 provided in the leg 130. A threaded fastener 138 inserted through the bore 136 and threadably engaging the bore 132 will urge legs 130 and 134 to converge toward each other thus clamping the shoe 120 in the bore 116.

Refer now to FIG. 3 of the drawings which is a frontal view of the fork assembly 12 mountable to the steering head 16 of the bicycle 10 and wheel 22 mounted to the fork assembly 12. In reference to the mounting of the wheel 22, those skilled in the art will appreciate that the distance between the outer surfaces of the locknuts 108 and 109 of the axle 24 will vary due to tolerances of manufacture and as between different manufacturers, adjustments required due to bearing wear, and other causes. The adjustable dropout provided by the end 114 of the strut 54 in combination with the dropout provided by the end 102 of the strut 50 readily accommodate the varying distances. To mount the wheel 22 on the fork assembly 12, the fastener 138 is removed which permits the shoe 120 installed in the bore 116 to have axial movement. The axle of the wheel 22 is inserted into the slot 104 in bracket 102 and the aligned slots 118 and 122 of the bracket 114. The axle 24 includes a known quick release and clamp mechanism and operation of the lever 140 will force the end nut 110 toward the lock nut 108 to thus force the end nut 110 and lock nut 108 against the recesses 106 on bracket 102 to thus lock the axle 24 to the bracket 102. Simultaneously, the spacer 142 will be forced toward the locknut 109 to thus force the locknut 109 against the surface 144 of the shoe 120 and spacer 142 will be forced against the opposite surface 146 (see FIG. 2) of the shoe 120 to thus lock the axle 24 to the shoe 120. It will be appreciated that there may be some frictional resistance to moving the shoe axially as required which may cause a deflection in either or both of the struts 50, 54. It is recommended that the struts 50, 54 be cycled in and out of the large tubes 26, 28 as by applying and releasing a downward force on the handlebars 20. This will assure that the shoe is properly positioned in the bore 116, permitting the struts 50, 54 to maintain their parallel attitude. The fastener 138 is then threadably inserted to clamp the shoe 120 in position in the bracket 114 to complete the mounting of the wheel 22.

A known conventional brake assembly 150 is mounted on the cross brace 80 and has brake pads 152 that engage the rim 154 of the wheel 22 by operation of a cable 156. The brake assembly 150 mounted to and traveling with the cross brace 80 maintains the pads 152 in proper alignment with the rim 154 as the struts 50, 54 move relative to the tubes 26, 28.

Refer now to FIG. 7 and 8 of drawings which illustrate an alternate embodiment of a fork assembly 160 for use on the bicycle 10 of FIG. 1. The fork assembly 160 is similar to the fork assembly 12 previously described in that it utilizes large tubes 162, 164 extending from the triple clamp 30 to provide the greatest structural integrity and has struts 166, 168 slidably movable in the large tubes 162, 164. Biasing members 100 are installed in the same manner between the cap 94 and the upper ends of the struts 162, 164. Of note, it will be appreciated that the struts 162, 164 require only the upper bushing 62 for engaging the end of the bumper 100 and guiding the rod 98. The bushing 62 may be reduced in longitudinal length to that of a member such as a washer and requires only the longitudinal center bore 90 for guiding the rod 98.

Bracket 170 on the lower end of strut 166 in combination with the bracket 168 on the lower end of the strut 168 provide an adjustable dropout in the same manner as the brackets 102 and 114 of the fork assembly 12.

A collar 176 is slidably mounted on the tube 162 and a collar 178 is slidably mounted on the tube 164. A cross brace 180 is fixedly attached to the collars 176, 178 as by welding with end 182 of the brace 180 attached to the collar 176 and end 184 of the brace 180 attached to the collar 178. Mounting studs 186 are provided near the ends 182, 184 for mounting a known brake system (not shown) in a conventional manner.

A tie rod 190 extends from the bracket 170 to the collar 176. One end of the tie rod 190 is fixedly attached to the bracket 170 and the other end is fixedly attached to the collar 176 as by welding. Another tie rod 190 is extended between and fixedly attached to the collar 178 and bracket 172 in the same manner. The tie rods 190 are of a length to properly position the brake assembly mounted on the cross brace 180 in relation to the rim of wheel 22 mounted on fork assembly 160.

Stop collars 192 are strategically positioned on the tubes 162, 164 to limit the outward travel of the struts 166, 168. The collars 176, 178 will abut the stop collars 192 to thus limit the movement of the struts 166, 168 out of the tubes 162, 164.

Those skilled in the art will recognize that variations and modifications may be made without departing from the true spirit and scope of the invention. The invention is therefore not to be limited to the illustrations and descriptions set forth but is to be determined by the appended claims.

We claim:

1. In a bicycle, a front wheel fork, shock absorbing suspension system, said bicycle having front and rear wheels supporting a frame adapted to support a rider, the front wheel having an axle and the suspension system extending from the axle to handlebars pivotally mounted on the frame and rider controlled for turning the front wheel and thereby the direction of the bicycle, said shock absorbing suspension system comprising;

a strut on each side of the front wheel connected to the axle and extended upwardly, a tube slidably surrounding each strut, a member connecting both tubes to the handlebars, and a biasing member between the tubes and the struts whereby upon thrusting of the strut in the tube deforms the biasing member for absorbing the upward thrusting movement, said biasing member urging return downward movement of the strut in the tube, and a rim actuating braking mechanism, and a by-pass connection connecting said braking mechanism to each of said struts while avoiding interference with the relative movement of said tubes.

2. A front wheel, shock absorbing system as defined in claim 1 wherein said struts have an upper end and said tubes extend past said upper end, a cap closing the upper ends of the tubes and said biasing member including a compressible biasing member in each tube between said upper end of the struts and the cap.

3. A front wheel fork, shock absorbing system as defined in claim 2 wherein said struts are rigidly connected together to tie the two struts together by their mutual connection to said braking mechanism thereby maintaining a fixed spaced relation therebetween.

4. A front wheel fork, shock absorbing system as defined in claim 3 wherein said by-pass connection includes a slot in said tube at the position of said braking mechanism, and said by-pass connection includes a fastener extended from said brake mechanism to said strut through said slot, said fastener and said slot configured to permit relative sliding of said tube and strut with the brakes secured in a fixed relationship to said strut.

5. A front wheel fork, shock absorbing system as defined in claim 4 wherein the connection includes a collar slidably mounted on each tube, the fasteners fastening the brake mechanism to the collars and a bar extending from each collar down to the portion of the struts extended below each tube.

6. A front wheel shock absorbing system as defined in claim 4 wherein the biasing member is a compressible bumper having a selected durometer mounted within each tube and between the strut and tube cap.

7. A front wheel shock absorbing system as defined in claim 6 wherein the cap is a removable cap that is removable for replacement of the bumper with a bumper of different selected durometer.

8. A front wheel shock absorbing system as defined in claim 7 wherein the biasing member for each tube is a multiple of bumpers permitting variation of the total thickness and permitting an intermix of bumpers having different durometers.

9. A front wheel shock absorbing system as defined in claim 1 wherein an adjustable connection connects one of said struts to said axle, said adjustable connection permitting parallel positioning of the struts on front wheels having different widths.

10. A front wheel shock absorbing system as defined in claim 9 wherein the adjustable connection includes a slidable shoe, and a clamp that clamps the strut to the slidable shoe, said shoe slidable on the axle against the wheel and relative to the strut, and said clamp clamping the strut to the shoe in the adjusted position with the strut maintained in its original parallel relation to the other strut.

* * * * *